United States Patent [19]

Elchinger

[11] 4,442,440

[45] Apr. 10, 1984

[54] INK JET GUTTER METHOD AND APPARATUS

[75] Inventor: Gilbert M. Elchinger, Rochester, N.Y.

[73] Assignee: Xerox Corporation, Stamford, Conn.

[21] Appl. No.: 365,123

[22] Filed: Apr. 5, 1982

[51] Int. Cl.³ ........................ G01D 18/00; G01D 15/18
[52] U.S. Cl. .......................................... 346/1.1; 346/75
[58] Field of Search ............................ 346/1.1, 75, 140

[56] References Cited

U.S. PATENT DOCUMENTS

| | | | |
|---|---|---|---|
| 3,836,914 | 9/1974 | Duffield | 346/75 |
| 3,875,574 | 4/1975 | Stone | 346/1.1 |
| 3,893,623 | 7/1975 | Toupin | 346/75 X |
| 3,936,135 | 2/1976 | Duffield | 346/1 |

FOREIGN PATENT DOCUMENTS

| | | | |
|---|---|---|---|
| 55-67468 | 5/1980 | Japan | 346/75 |

OTHER PUBLICATIONS

I.B.M. Technical Disclosure Bulletin vol. 22, No. 5, Oct. 1979, pp. 1965–1966, 346–375.

*Primary Examiner*—Donald A. Griffin
*Attorney, Agent, or Firm*—Robert A. Chittum; Stephen J. Schultz

[57] ABSTRACT

An ink jet printer having a drop generator for directing streams of ink droplets through deflection electrodes so that droplets travel to either a gutter or to selected regions on a printing medium. The gutter is constructed of a first low surface energy material such as parylene coated to a high surface energy material such as stainless steel. Only a portion of the steel is coated so that a boundary between high and low surface energy material is contacted by ink after it strikes the gutter. This boundary attracts the ink away from the gutter entrance due to capillary action and in a preferred embodiment is also aided by the force of gravity due to the orientation of the gutter.

12 Claims, 4 Drawing Figures

INK JET GUTTER METHOD AND APPARATUS

BACKGROUND OF THE INVENTION

1. Field of the Invention

The present invention relates to ink jet printing and in particular to an improved ink jet printer gutter design.

2. Prior Art

Ink jet printers are known in the art. These printers direct individual ink droplets to a recording medium along controlled paths to create a printed pattern. A typical ink jet printer can operate in an all character mode, all graphics mode, or a combined or mixed character/graphics mode. Ink jet printing architectures have improved to allow individual droplet resolution of approximately 300 ink spots per inch along the printed medium. The ink jet printer avoids the noise associated with a conventional impact typewriter and can operate with greater resolution and approximately the same speed as a so-called dot matrix printer.

Ink jet printers fall into two main architectural categories. The so-called drop on demand printers only generate ink droplets as the drop generator moves past a location on the print medium to be encoded with an ink spot. This type of drop on demand ink jet printer has perceived advantages from an architectural simplicity standpoint in that all that is required is a mechanism for controllably squirting droplets and some means for causing relative motion between the droplet generator and the paper to be encoded with the printed pattern. Perceived constraints on drop on demand operating speed, however, dictate continued interest in so-called continuous or Rayleigh-type ink jet printers.

The continuous type ink jet printer also comprises a drop generator for squirting ink droplets in the direction of a print medium. The continuous type printer, however, also includes means for selectively charging certain ones of the ink droplets as they are generated to allow their subsequent trajectory to be controlled. After selective charging of the ink droplets, those droplets are directed through deflection electrodes which create electric fields in the vicinity of the droplet trajectory. The deflection electrodes set up electric fields which deflect the ink droplets away from their initial trajectory depending upon the size and polarity of the charge induced at the droplet formation point. This deflection capability allows certain ones of the charged ink droplets to be deflected into a guttering mechanism so that only selected ones of the total number of droplets produced by the generator strike the print medium. In this way the continuous type printer generates a desired pattern of ink spots on the print medium. The architectural design of the continuous type printer is significantly more complex than the drop on demand system. Droplet charging, deflecting, and guttering apparatus is now required and in most ink jet printers of the continuous type, an ink recirculating system is needed to process ink droplets which are guttered. Once the recirculated ink has been processed, purified, and de-aerated, it is routed back to the droplet generator for another pass through the system.

In accordance with one continuous of Rayleigh-type printer design, those ink droplets which are to be guttered and recirculated for subsequent use are left uncharged at the droplet formation stage of printing. Those droplets intended to strike the paper or print medium are charged to varying degrees depending on their intended position on the medium. As these charged droplets pass through the droplet deflecting apparatus, they are deflected away from their initial trajectory past the droplet gutter to strike selected portions of the paper. Since during a typical printing operation, the majority of generated droplets do not strike the paper, this architecture results in a stream of guttered droplets passing directly into the droplet gutter while certain ones of the droplets are deflected away from this trajectory to a print medium. The number of gutters required for recirculating the ink varies with the architecture. Single nozzle ink jet printers are known which traverse back and forth across the paper width and therefore require only a single droplet gutter. Other architectures utilize multiple nozzles spaced across the paper width with each nozzle having its own individual gutter for recirculating droplets.

A problem with prior art ink jet printers has been clogging in the droplet gutter area. If ink accumulates inside these gutters and is not drawn away from the gutter entrance, ink droplets impinging upon the clogged gutter will break up at the entrance causing a misting problem in the vicinity of the droplet path of travel which can foul other apparatus comprising the printer as well as degrade image appearance on the paper. As well, the clogged gutter can cause ink to overflow into the deflection plates and cause shorting.

One prior art solution to gutter clogging problems was the introduction of a vacuum into the ink processing loop downstream from the droplet gutter which caused ink droplets and ink in the gutter to be attracted away from the gutter entrance into the ink processing portions of the recirculating processing loop. The problem with this technique is that the air rushing into the gutter causes the droplet not directed to the gutter to flutter, or vary from their intended path.

SUMMARY OF THE INVENTION

The present invention enhances ink movement away from a gutter entrance and improves the ink flow characteristics without the use of a vacuum to assist ink flow. The invention is practiced through using selected materials to construct the droplet gutter which enhance fluid flow away from the entrance toward ink reprocessing stations.

The essence of the invention is embodied by the utilization of a droplet catch surface of low surface energy material supported in the impact region by a support structure having a higher surface energy material so that ink striking the impact region is attracted to the support structure by capillary attraction. A preferred embodiment of the invention utilizes a low surface energy material comprising polytetrafluoroethylene mounted in the impact region by a higher surface energy material such as stainless steel. Ink that accumulates in the boundary between the polytetrafluoroethylene and the stainless steel moves from the low surface energy material to the high surface energy material where it can be drained by gravity. Ink does not tend to accumulate in the vicinity of the gutter entrance and accordingly, the problems encountered with ink misting and/or clogging in the continuous type printing system are avoided.

From the above, it should be appreciated that one object of the present invention is an improvement in ink guttering performance in an ink jet printer. Other objects, advantages and features of the present invention will become better understood when a detailed description of a preferred embodiment of the invention is described in conjunction with the accompanying drawings.

DETAILED DESCRIPTION OF THE PREFERRED EMBODIMENT

Figure 1:
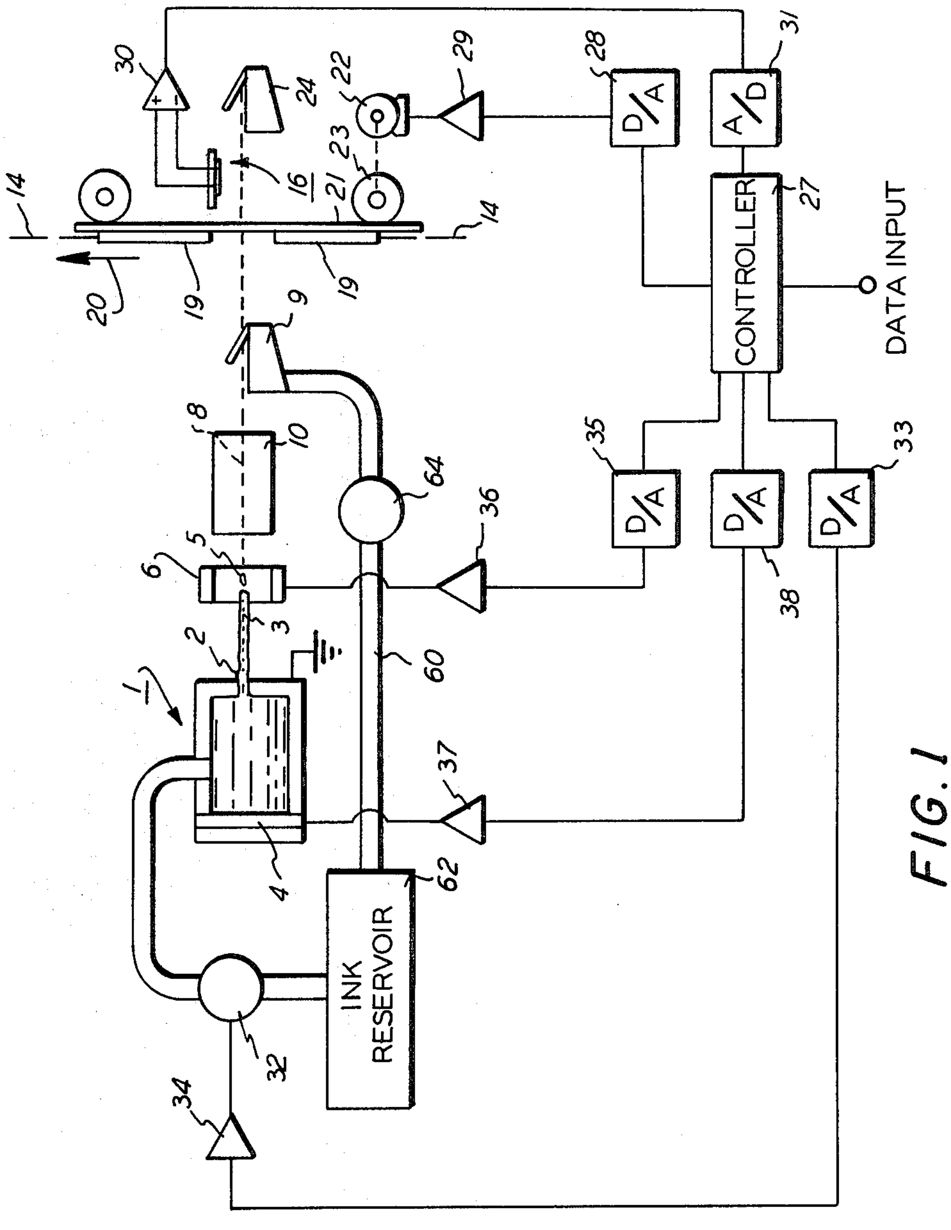
FIG. 1 is an elevation view in schematic form of an ink jet printer according to the present invention.

Turning now to the drawings, FIG. 1 shows an ink jet printer including an ink manifold 1 which defines a plurality of nozzles 2 through which ink is emitted under pressure creating a continuous filament 3 of the fluid ink from each nozzle. A piezoelectric device 4 coupled to a wall of the manifold 1 periodically stimulates the fluid with a pressure wave which promotes the formation of drops 5 adjacent a charging electrode 6. The fluid ink is conductive so that a voltage applied to the charging electrode at the moment of drop formulation results in a drop 5 having a charge induced on it proportional to the voltage applied to the electrode 6.

Not all drops are charged by the electrode 6. The uncharged drops travel along a straight trajectory 8 to a gutter 9. The charged drops are deflected in a plane normal to FIG. 1 by deflection plates 10 and 11 (see FIG. 2) which have a high electrostatic field between them established by ±V potentials. Typically, the charging voltages applied to electrode 6 are in the range of 10 to 200 volts and the potential difference between the plates 10 and 11 is in the vicinity of 2000 volts.

Figure 2:
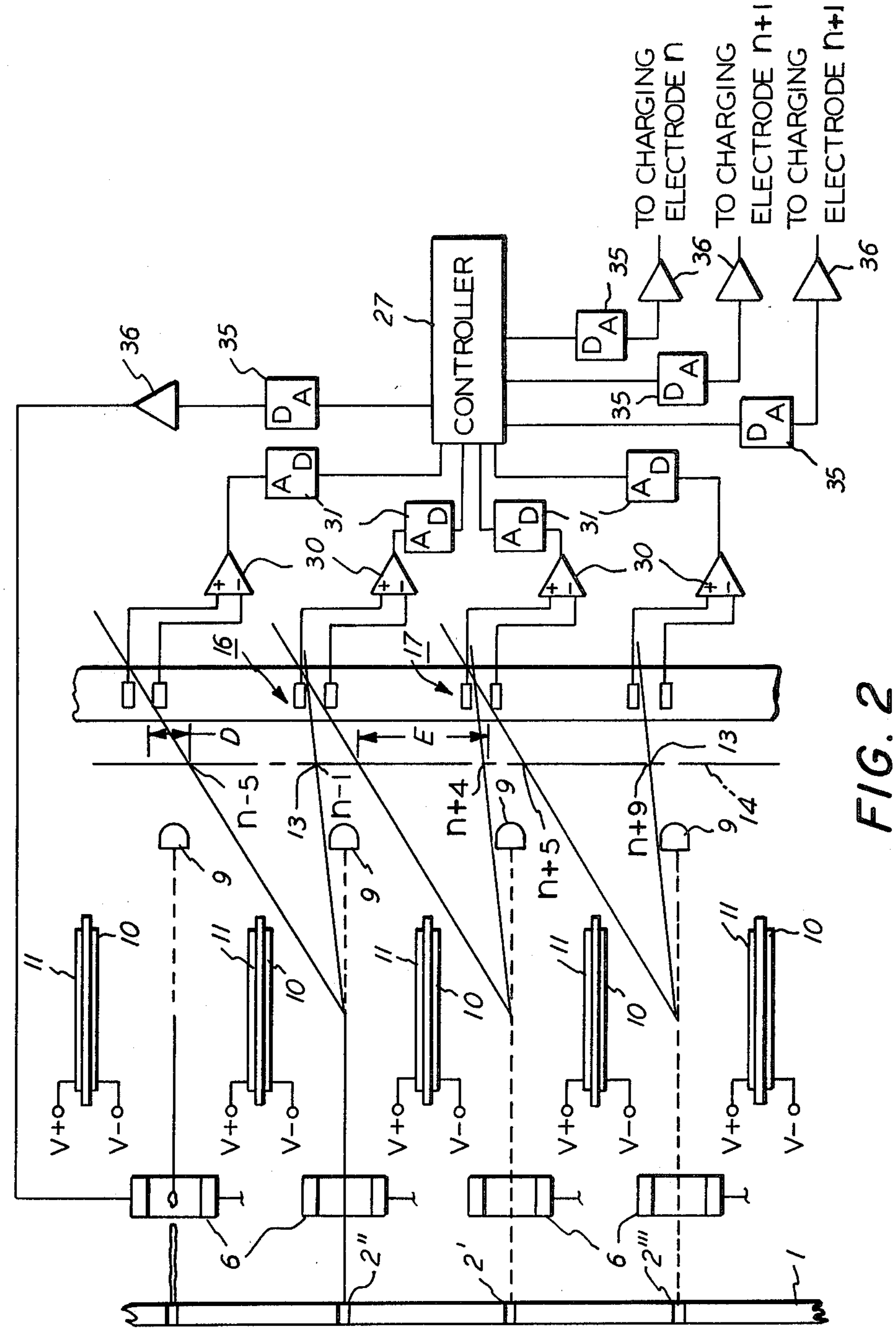
FIG. 2 is a plan view of the printer of FIG. 1.

Referring to FIG. 2, the charged drops from a center nozzle 2′ form a trace of length E along a print plane 14 that is a segment of the entire row of pixel positions or points across that plane. In the example shown, five pixels n through n+4 can be marked with drops from the middle nozzle 2′. The drops are about 0.035 millimeters (mm) in diameter and spread to a spot of about 0.05 mm when they impact a target. The centers of these pixels are spaced a distance D from each other. Stitching of the segments together is achieved when the nozzle 2″ to the left of the first nozzle 2′ provides droplets to mark the n−1 through n−5 pixels and the nozzle 2″ to the right marks the n+5 through n+9 pixels.

Sensor pairs 16,17 sense when a drop stream from the center nozzle 2′ is directly under those sensors. The charging voltage needed to center or align the drops under the two sensor pairs is then known. The drop deflection process is substantially linear. The intermediate pixels, for each nozzle such as pixels n+1 through n+3, are aligned because the electrostatic deflection is linear for drops of constant mass and constant velocity. Therefore, the drops from a given nozzle can be positioned accurately to all pixels within its range. Points at the extremes of a nozzle's deflection range are selected in the embodiment of FIGS. 1 and 2 so that adjacent nozzles can share sensors. Thus, droplets for the second nozzle 2″ are sensed by the sensor 16. In a given system, the designer could choose to have two sensors for each nozzle rather than spaced at the extremes of the deflection range.

Returning to FIG. 1, the printer is designed to record information on record members 19. The record members are transported along the print plane 14 at a constant velocity in the direction of arrow 20. The relative movement is selected to yield a plurality of rows of spots on the record member. The record members are transported by a conveyor 21 that is propelled by a motor 22 coupled to the conveyor by a drive 23. The conveyor is any suitable device such as parallel belts supported by pulleys. The sensors, 16,17 are shown located downstream from the record members 19. The belts are spaced so that the drop streams from the nozzles can reach the sensors when the record member is out of the way. A droplet catcher 24 is located downstream of the sensors to catch the drops used to calibrate the printer. Although the sensors 16,17 are shown positioned downstream from the record members 19 in an alternate embodiment they might be positioned to sense droplet trajectories prior to those droplets reaching the print plane 14.

The system of FIG. 1 makes black marks on white paper, for example, in response to electrical information signals. The information or video signals are applied to a controller 27 via a data input terminal. One suitable controller is a programmed microprocessor such as the model 6800 sold by the Motorola Corporation. Video signals representative of an image, for example, are stored in designated memory locations within the controller memory space.

The controller 27 interfaces with the printer through output ports that issue electrical control signals to the various system components. A digital to analog (D/A) converter 28 and amplifier 29 couple the controller to the record transport motor 22. Under the direction of the controller, a record member 19 is moved by the transport to the vicinity of the ink jet streams. Prior to its arrival, the nozzles send droplet streams to calibrate the printer. Each droplet sensor communicates with the controller 27 via a differential amplifier 30 and an analog to digital (A/D) converter 31. The sensors aid in aligning the drop streams to their left and right sensors, e.g. sensors 16,17 for the stream from the center nozzle 2′. The controller 27 performs the sensing and calibration for the multiple nozzles comprising the printer one nozzle at a time.

The controller 27 also includes an output to drive the piezoelectric device 4 that promotes droplet formation. The piezoelectric device is driven at a frequency that gives rise to drop generation rates of the range from about 100 to about 125 kilohertz (KHz). An amplifier 37 and D/A converter 38 couple the piezoelectric device to the controller.

The controller 27 interfaces with each of the charging electrodes 6 via an amplifier 36 and digital to analog converter 35. The voltage appearing on each electrode 6 at the time of droplet breakoff dictates the charge that is induced on each of the ink droplets. The analog output from each D/A converter 35 along the array of nozzles 2 must be varied in accordance with the print or no print decision for each droplet in order to controllably deflect ink droplets to specific regions on the record member 19. Details regarding the charging process may be obtained by referring to co-pending U.S. application Ser. No. 326,721 to Marchand filed Dec. 2, 1981 and assigned to the assignee of the present invention. That earlier filed patent application is expressly incorporated herein by reference.

Figure 3:
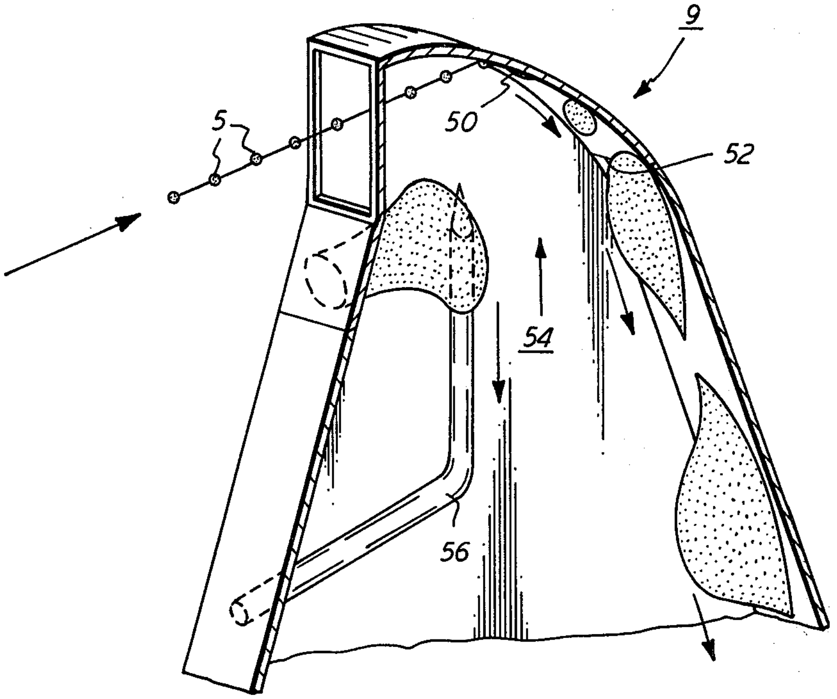
FIG. 3 is a perspedtive view of a gutter used to catch and recirculate ink in the FIG. 1 printer.
Figure 4:
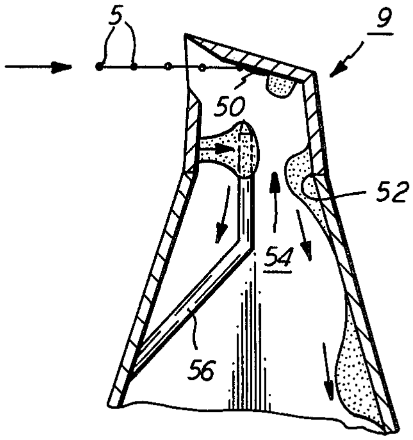
FIG. 4 is a sectional elevation view of the FIG. 3 gutter.

A perspective view of a stainless steel gutter 9 is shown in FIG. 3 with a sectional elevation view of the same gutter shown in FIG. 4. The gutter 9 defines a droplet impact surface 50 where the stainless steel is coated with a material such as parylene or polytetrafluoroethylene having a low surface energy. As the ink droplets 5 impact the gutter three phenomena combine to move the ink away from the impact region. The momentum or inertia of the moving droplets causes the ink to "slide" along the surface or region 50 away from the initial impact area. In the orientation shown, gravity pulls the ink away from the impact zone to the an interface 52 between high and low surface energy material. Finally, capillary attraction pulls the ink from the low surface energy material onto the higher surface energy, wettable, metallic surface as gravity continues to move the ink away from the impact zone.

The narrowest section of the gutter 9 is the mouth or inlet 54. Any accumulated ink that may bridge this mouth 54 will be unstable and will be induced to flow down to the wide portion of the gutter by gravity and/or capillary action. The interface or boundary 52 between materials may include smooth wall surfaces or may also comprise, as shown, a metal extension 56 which reaches up into the plastic coated mouth or inlet 54.

The gravity and capillary forces may be supplemented by introduction of a slight vacuum to pull ink away from the gutter entrance. The pressure of this vacuum should help the ink flow away from the gutter but must not disrupt the path of ink droplets not directed to the gutter. This vacuum is introduced at a point downstream from the gutter along an ink recirculating conduit 60 which leads to an ink reservoir 62. As is known in the art the conduit 60 may include ink replenishment and de-aerating apparatus as well as means such as a pump 64 for reducing pressure at the gutter 9.

The disclosed gutter design increases the flow rates achievable in the recirculating loop. Specifically, ink jet gutters not having the capillary interface feature cannot handle the same ink flow rates which gutters of identical geometric configuration having the capillary flow inducing interface are able to handle. According to a preferred construction technique, the parylene is coated to stainless steel by evaporation of the parylene in a low vacuum with subsequent condensation of the parylene to a thickness of 1 to 2 microns on a cool (25° C. or cooler) stainless steel gutter surface with a roughness not exceeding 10–20 microns. Although a coating technique comprises the preferred fabrication technique the low surface energy material might also comprise a solid member supported by a high surface energy support with a smooth member interface bridging the two in the region of ink flow.

Ink is pumped from the ink reservoir 62 by a pump 32. The speed of the pump 32 is monitored and regulated to produce a specific ink pressure in the manifold 1. To maintain the pressure the controller 27 regulates pump speed via a D/A controller 33 and accompanying amplifier 34. Return of the ink back to the manifold 1 closes the ink processing loop. Use of the disclosed gutter materials prevent clogging of ink in the gutter and allow in throughput rates necessary for high speed, high resolution continuous type ink jet printing.

The present invention has been described with a degree of particularity. It is the intent, however, that all design modifications or alternatives falling within the spirit or scope of the appended claims be protected by the present application.

I claim:

1. A continuous ink jet printer system wherein certain ink droplets are collected by a guttering apparatus comprising:

(a) ink jet forming means for generating a stream of ink droplets during print and non-print intervals, (b) first means defining a droplet impact zone on a first surface having a first surface energy whereupon droplets impact during said non-print interval, and (c) second means having a second surface with a surface energy higher than that of said first surface and positioned relative to said first surface, forming a boundary therewith, across which ink in said impact zones will move by way of capillary attraction.

2. The guttering apparatus of claim 1 wherein said first means comprises polytetrafluoroethylene and said second means comprises a metal.

3. The apparatus of claim 2 wherein the metal is stainless steel.

4. A method for recirculating ink from a droplet generator in a continuous ink jet printing system through an ink processing station and back to said droplet generator comprising the steps of:

forcing one or more ink streams under pressure through an orifice to produce one or more discrete droplet streams traveling along a path toward a recording medium;

deflecting certain ones of said droplets from said one or more streams away from their initial trajectory to allow only certain ones of said droplets to strike said medium;

intercepting those droplets not intended to strike said recording medium with a receiving structure having a cavity therein with an opening thereto through which the droplets enter the cavity, the internal surface of said cavity having a first surface energy;

connecting a supporting structure to said receiving structure, the supporting structure being below said receiving structure and having a passageway therethrough, the internal surface of said passageway having a second surface energy which is higher than that of the first surface energy and having one edge abutting an edge of the internal surface of the receiving structure to form a boundary therebetween, so that the guttered ink in the vicinity of the boundary is pulled from the receiving structure cavity with the lower surface energy to the supporting structure passageway with the higher surface energy by capillary attraction, thereby avoiding ink buildup in the receiving structure cavity; and moving said guttered ink through subsequent processing steps and back to the droplet generator.

5. In a continuous ink jet printer, apparatus for recirculating ink droples not directed to a print medium comprising:

a droplet impact defining means having a surface of low surface energy material supported in an impact region by a support structure having a surface with a higher surface energy than that of the surface of the impact defining means, the impact defining means surface and the support structure surface being connected to each other to form a boundary therebetween, such that ink striking the droplet impact defining means surface is attracted to the support structure surface by capillary attraction.

6. Ink jet printing apparatus comprising:

means for directing one or more controlled streams of ink droplets toward a recording member;

means associated with each of said one or more streams for deflecting droplets in said streams from an initial trajectory to a deflected trajectory;

means for intercepting droples thereby preventing them from striking said recording member, said means for intercepting including an impact surface of low surface energy material connected to a higher surface energy material to attract ink impacting said low surface energy material away from said impact surface; and means coupled to said means for intercepting for recirculating ink back to said means for directing for re-use as a marking material.

7. The apparatus of claim 6 wherein said low surface energy material is positioned above said high surface energy material so that the ink movement away from the impact surface is aided by the force of gravity.

8. An ink jet printer having a drop generator for continuously generating and directing ink droplets either to a guttering apparatus or toward a recording medium and having means for deflecting said droplets which are directed toward the recording medium in a controlled manner, so that the ink droplets are placed on the recording medium at specific predetermined locations, said guttering apparatus comprising:

a substantially hollow receptacle having first and second sections;

the first section having an inlet for receiving the ink droplets directed to said guttering apparatus and an impact zone therein whereupon the droplets land when they enter the inlet, said first section having an internal surface which has a first surface energy;

the second section being below and supporting said first section, said second section providing means for conducting the ink droplets from the first section to a means for collecting and recirculating the ink droplets, said second section having an internal surface which has a second surface energy that is higher than said first surface energy; and a boundary being formed between the internal surfaces of said first and second sections across which the ink droplets will move from the first section to the second section by way of capillary attraction, so that an increased rate of flow of ink droplets may be obtained through said guttering apparatus.

9. The apparatus of claim 8, wherein the internal surface of the first section comprises polytetrafluoroethylene and the internal surface of the second section is stainless steel.

10. The apparatus of claim 9, wherein the guttering apparatus further comprises an elongated extension attached on one end to the internal surface of the second section and the other end extending into the first section and positioned unsupported and adjacent the inlet thereof to provide a readily wettable surface to clear ink accumulating near the inlet and further increase the flow rate of ink droplet from said first section to said second section.

11. The apparatus of claim 10, wherein the surface of the extension has the same surface energy as that of the internal surface of the second section.

12. The apparatus of claim 10, wherein the apparatus further comprises a means for reducing the pressure in the first and second sections of said guttering apparatus so that the forces acting on the ink droplets are supplemented to further increase the flow rate of ink droplets from said first section through said second section to the means for collecting and recirculating the ink.

* * * * *

UNITED STATES PATENT AND TRADEMARK OFFICE

CERTIFICATE OF CORRECTION

PATENT NO. : 4,442,440

DATED : April 27, 1984

INVENTOR(S) : Gilbert M. Elchinger

It is certified that error appears in the above-identified patent and that said Letters Patent are hereby corrected as shown below:

Claim 6, column 7, line 7, substitute the word "droples" to - -droplets- -.

Signed and Sealed this

*Twenty-first* Day of *August 1984*

[SEAL]

*Attest:*

GERALD J. MOSSINGHOFF

*Attesting Officer* *Commissioner of Patents and Trademarks*